(12) United States Patent
Kinebuchi et al.

(10) Patent No.: US 9,542,905 B2
(45) Date of Patent: Jan. 10, 2017

(54) DISPLAY DEVICE AND CONTROL METHOD FOR DISPLAY DEVICE

(71) Applicant: Seiko Epson Corporation, Tokyo (JP)

(72) Inventors: Tadashi Kinebuchi, Okaya (JP); Kaoru Yamaguchi, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/656,791

(22) Filed: Mar. 13, 2015

(65) Prior Publication Data
US 2015/0279307 A1  Oct. 1, 2015

(30) Foreign Application Priority Data
Mar. 26, 2014  (JP) ................. 2014-063299

(51) Int. Cl.
*G09G 5/00* (2006.01)
*G06F 3/14* (2006.01)
*G09G 3/00* (2006.01)

(52) U.S. Cl.
CPC ............ *G09G 5/003* (2013.01); *G06F 3/1446* (2013.01); *G09G 3/002* (2013.01); *G09G 2330/026* (2013.01); *G09G 2370/042* (2013.01)

(58) Field of Classification Search
None
See application file for complete search history.

(56) References Cited

U.S. PATENT DOCUMENTS
2011/0292282 A1  12/2011  Isozu

FOREIGN PATENT DOCUMENTS
JP           8-223591 A     8/1996
JP        2011-254238 A    12/2011

*Primary Examiner* — Michelle Chin
(74) *Attorney, Agent, or Firm* — ALG Intellectual Property, LLC

(57) ABSTRACT

A display device that can be used with another display device, includes: a display unit; a command receiving unit which receives a control command or ID information from an external remote controller; and a command processing unit. The display unit displays the display device's own ID in response to reception of the control command by the command receiving unit. If the command receiving unit receives the ID information indicating the display device's own ID after the display unit starts displaying the display device's own ID, the command processing unit performs processing corresponding to the control command.

5 Claims, 7 Drawing Sheets

DISPLAY DEVICE AND CONTROL METHOD FOR DISPLAY DEVICE

The entire disclosure of Japanese Patent Application No. 2014-063299, filed Mar. 26, 2014 is expressly incorporated by reference herein.

BACKGROUND

1. Technical Field

The present invention relates to a display device and a control method for a display device.

2. Related Art

There is a system in which a single common controller controls a plurality of display devices when all the plurality of display devices are used (see JP-A-8-223591 and JP-A-2011-254238). JP-A-8-223591 discloses a method in which, in the case of processing a plurality of screens as one screen, an ID of each display unit is set and a single controller performs screen adjustment by transmitting a command with the ID to each display. JP-A-2011-254238 discloses a method in which, in the case of controlling a plurality of display units from a single controller, an ID is displayed and connection is established using the ID, thus controlling one display unit.

In the configuration of JP-A-8-223591, each display device does not display the provided ID. Meanwhile, in the configuration of JP-A-2011-254238, each display device displays the ID. Therefore, according to the configuration of JP-A-2011-254238, a user can easily learn the ID of the target display device. However, in the configuration of JP-A-2011-254238, when controlling one display device, the display device and the controller must be connected together in advance. Therefore, for example, in the case of causing a display device to execute the following command, the user may find the operation troublesome. For example, causing a display device to execute a simple command such as power-off is a case in point. If such a command is directed only to a single display device, the user can cause the command to be executed, normally by one operation. However, in the configuration where a command execution target is designated in advance, the user is to cause a single command to be executed by taking three steps: (1) causing each display device to display the ID, (2) designating the ID of the target display device, and (3) transmit the command thereto. In this case, the user may find the operation procedures troublesome, particularly when causing a simple command to be executed. That is, there is a problem that the operation procedures (the number of operation procedures) are many, despite the simple control operation.

SUMMARY

An advantage of some aspects of the invention is to provide a display device and a control method for a display device that enable simpler control of individual display devices.

An aspect of the invention is directed to a display device that can be used with another display device, and includes: a display unit; a command receiving unit which receives a control command or ID information from an external remote controller; and a command processing unit. The display unit displays the display device's own ID in response to reception of the control command by the command receiving unit. If the command receiving unit receives the ID information indicating the display device's own ID after the display unit starts displaying the display device's own ID, the command processing unit performs processing corresponding to the control command.

According to this configuration, a user only needs to execute two process steps: (1) transmitting a control command, and (2) designating the ID of the target display device. Therefore, the individual display devices can be controlled more simply.

The display device may further include a storage unit which stores information indicating whether the display device is used with the another display device. If the information indicates that the display device is used with the another display device, the display unit may display the display device's own ID in response to reception of the control command by the command receiving unit. If the information does not indicate that the display device is used with the another display device, the command processing unit may perform processing corresponding to the control command in response to reception of the control command by the command receiving unit.

According to this configuration, the operation of designating the ID can be omitted when the display device is not used with another display device.

The display device may further include a control command storage unit which stores the control command. In response to reception of the control command by the command receiving unit, the command processing unit may store the control command that is received, into the control command storage unit. If the command receiving unit receives the ID information indicating the display device's own ID after the display unit starts displaying the display device's own ID, the command processing unit may read the control command from the control command storage unit and perform processing corresponding to the control command that is read. If the command receiving unit does not receive the ID information indicating the display device's own ID after the display unit starts displaying the display device's own ID, the command processing unit may erase the control command stored in the control command storage unit.

According to this configuration, resources required for the processing can be reduced.

Another aspect of the invention is directed to a control method for a display device that can be used with another display device. The display device includes: a display unit; a command receiving unit which receives a control command or ID information from an external remote controller; and a command processing unit. The method includes: causing the display unit to display the display device's own ID in response to reception of the control command by the command receiving unit; and causing the command processing unit to perform processing corresponding to the control command if the command receiving unit receives the ID information indicating the display device's own ID after the display unit starts displaying the display device's own ID.

According to this configuration, the user only needs to execute two process steps: (1) transmitting a control command, and (2) designating the ID of the target display device. Therefore, the individual display devices can be controlled more simply.

With the above configurations, the individual display devices can be controlled more simply.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
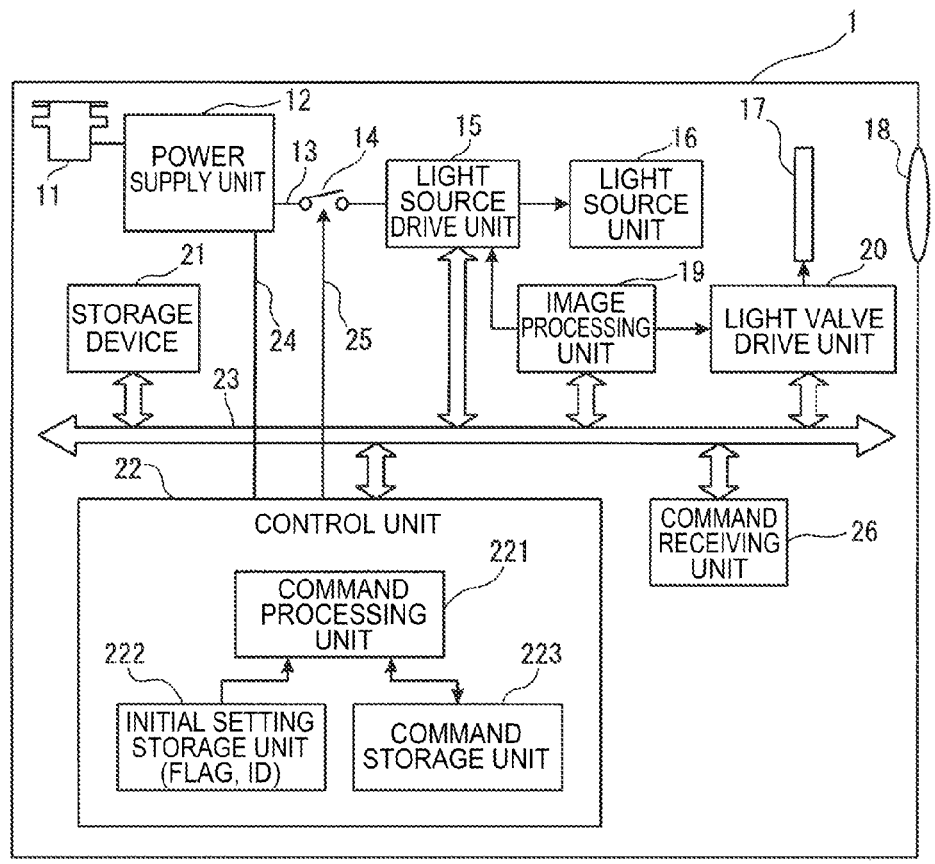
FIG. 1 is a block diagram for explaining an example of configuration of a display device according to a first embodiment.
Figure 2:
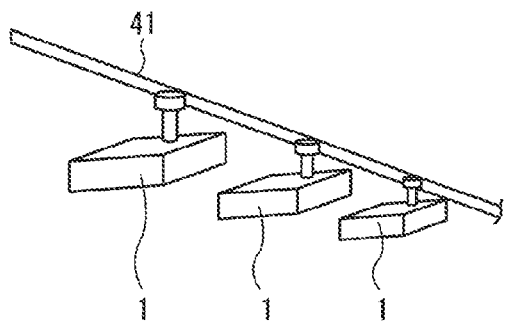
FIG. 2 is an explanatory view for explaining an installation example in the case where a plurality of the display devices of FIG. 1 is used together.

Hereinafter, a first embodiment of the invention will be described with reference to the drawings. FIG. 1 is a block diagram for explaining an example of configuration of a display device 1 according to the first embodiment. The display device 1 of the first embodiment is configured as a projector that can be used with another projector. FIG. 2 is an explanatory view for explaining an installation example in the case where the display device 1 is used with other display devices 1. The display device according to the invention is not limited to a projector and can be, for example, a display having a display panel, or both a projector and a display.

The display device 1 shown in FIG. 1 has a connector 11, a power supply unit 12, a power line 13, a switch 14, a light source drive unit 15, a light source unit 16, a light valve 17, a projection lens 18, an image processing unit 19, and a light valve drive unit 20. The display device 1 shown in FIG. 1 also has a storage device 21, a control unit 22, a bus 23, a power line 24, a signal line 25, and a command receiving unit 26.

Figure 3:
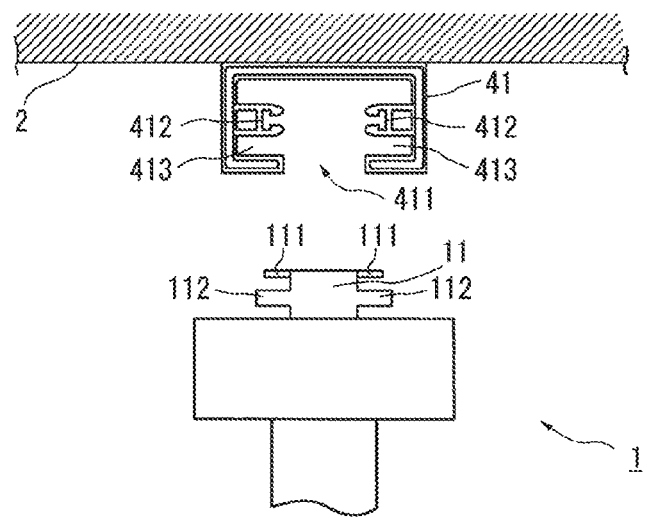
FIG. 3 is a side view showing a connector of FIG. 1 and a duct of FIG. 2.

The connector 11 is a connection part that is mechanically supported and electrically connected to a duct 41 fixed on a ceiling or wall surface, as shown in FIG. 2. The duct 41 shown in FIG. 2 is a gutter-shaped power supply member called lighting duct, lighting rail or the like, and is equivalent to, for example, a lighting apparatus duct, power supply duct, or power-supply common duct conforming to the JIS C8366 standard. An adaptor or the like for a lighting apparatus or for power supply can be attached to the duct 41. To facilitate understanding, a cross section of the duct 41 is illustrated in the side of FIG. 3. However, the ends of the duct 41 may or may not be open. The duct 41 is installed on a ceiling surface or wall surface and electrically connected to mains electricity, not shown, and supplies power to the display device 1 via the connector 11.

The connector 11 is formed at a top part of the casing of the display device 1 in such a way as to be connectable to the duct 41, as shown in FIG. 2. The connector 11 has a protruding shape that protrudes upward from the top art of the casing of the display device 1, and a pair of contact conductors 111, 111 and a pair of locking pieces 112, 112 are provided to stand up on the lateral surfaces of the connector 11, as shown in FIGS. 2 and 3. The locking pieces 112, 112 are each shaped into a flat plate and protrude from the connector 11 into the opposite directions to each other. The contact conductors 111, 111 are each formed by shaping copper or other metals into a flat plate. The contact conductors 111, 111 protrude from the connector 11 into the opposite directions to each other.

The duct 41 has an opening 411 extending along a longitudinal shape of a hollow main body having a long shape, and supports the connector 11 or the like inserted from this opening 411. When the duct 41 is fixed to an installation surface 2 of the ceiling, the opening 411 opens downward so that the display device 1 or the like can be installed from below and suspended there. The duct 41 may also be fixed to a wall surface. In this case, the opening 411 opens in a horizontal direction so that the display device 1 or the like can be installed and fixed from the side.

The duct 41 has a pair of conductors 412, 412 extending along the longitudinal direction of the main body of the duct 41. The conductors 412, 412 are made of copper or other metals shaped in the form of a bar or tape, and are electrically connected to mains electricity. The conductors 412, 412 are connected, for example, to a commercial 100-V two-pole AC power source. One conductor 412 is a grounding pole and the other conductor 412 is a non-grounding pole. The duct 41 also has grooves 413, 413 that lock a member that is wider than the opening 411. The grooves 413, 413 are arranged on both sides of the opening 411, inside the duct 41. An object fitted in these grooves 413, 413 is supported by the duct 41.

To install the display device 1 on the duct 41, the connector 11 is inserted in the opening 411. At this point, the connector 11 is inserted in the opening 411 in such a direction that the locking pieces 112, 112 and the contact conductors 111, 111 are arranged along the longitudinal direction of the duct 41. As the connector 11 is turned 90 degrees after the locking pieces 112, 112 and the contact conductors 111, 111 enter into the duct 41, the connector 11 is connected to the duct 41. The turning of the connector 11 causes the contact conductors 111, 111 to contact the conductors 412, 412 of the duct 41 to be conducted and thus enables supply of power from the conductors 412, 412 to the contact conductors 111, 111. Since the locking pieces 112, 112 fit in the grooves 413, 413, the connector 11 is fixed to the duct 41 via the locking pieces 112, 112. In this state, the connector 11 does not move in the longitudinal direction of the duct 41, either.

Meanwhile, the power supply unit 12 shown in FIG. 1 receives supply of, for example, single-phase two-pole 100-V AC power from the contact conductors 111, 111 provided on the connector 11. The power supply unit 12 supplies low-voltage DC power such as 3.3 V or 5 V to each part of the control system inside the display device 1 via the power line 24 or the like. The power supply unit 12 is also capable of supplying high-voltage power and, for example, supplies 12-V DC power to the light source unit 16 and the light source drive unit 15 or the like via the power line 13. In the configuration shown in FIG. 1, the power line 13 is connected to the light source drive unit 15 via the switch 14. The switch 14 is controlled into an ON or OFF state by a predetermined control signal inputted via the signal line 25. The switch 14 may also be provided within the power supply unit 12.

The light source drive unit 15, under the control of the control unit 22, outputs a drive signal to the light source unit 16 and thus causes the light source unit 16 to turn on.

Figure 4:
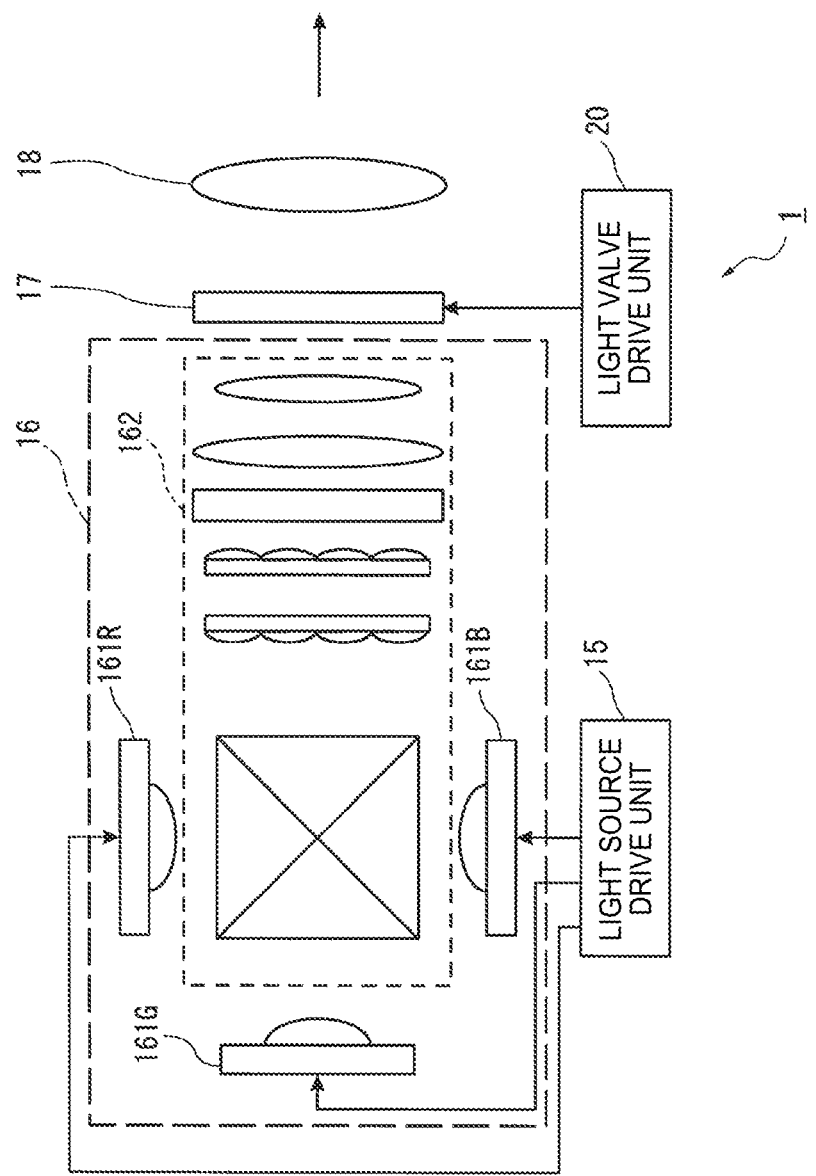
FIG. 4 is an explanatory view for explaining an example of configuration of a light source unit or the like of FIG. 1.

The light source unit 16 has an LED (light emitting diode) 161R, an LED 161G, an LED 161B, and an irradiation optical system 162, for example, as shown in FIG. 4. The LED 161R is an LED corresponding to R (red light). The LED 161G is an LED corresponding to G (green light). The LED 161B is an LED corresponding to B (blue light).

The light source drive unit 15 outputs a pulse to turn on the respective LEDs 161R, G and B of the light source unit 16. The LEDs 161R, G and B repeat turning on and off at the frequency of the input pulse. The light source drive unit 15 can adjust the luminance of emitted light from each LED by changing the frequency of the pulse outputted to the LEDs 161R, G and B.

The light source unit 16 may include LEDs corresponding to four or more different component colors, or may include LEDs corresponding to two different component colors. Also, the light source unit 16 may include one LED that emits white light. The light source unit 16 may have, instead of the LED, an organic or inorganic semiconductor laser, or an organic EL (electroluminescent) element, or may include a phosphor using an LED or laser as an exciting light source. Moreover, the light source unit 16 may have a high-pressure mercury lamp or xenon lamp.

The irradiation optical system 162 condenses the light emitted from the LEDs 161R, G and B and casts the condensed light as parallel rays onto the light valve 17. The irradiation optical system 162 combines the optical paths of the light (light beams) from the three LEDs 161R, G and B, via a dichroic mirror. The light passed through the dichroic mirror is converted to parallel rays by an integrator including a fly's eye lens. The parallel rays pass through a polarization conversion element and are cast onto the light valve 17.

The light valve 17 is a single-plate transmission-type liquid crystal light valve. The liquid crystal light valve of this embodiment includes a pair of polarizers and a liquid crystal panel situated between the polarizers. The light valve drive unit 20 drives the liquid crystal panel of the light valve 17 to write an image. The LEDs 161R, G and B, and the light valve 17 are driven by an RGB sequential method, that is, a color sequential method. Therefore, the display device 1 can project a full-color image. Then, the light (image light) modulated by the light valve 17 is projected toward a projection target surface such as a wall or screen, via the projection lens 18.

The image processing unit 19, under the control of the control unit 22, reads out image data to be projected, performs various kinds of the processing such as resolution conversion, color tone correction and keystone correction, and outputs the processed image data to the light valve drive unit 20 on a frame basis. The light valve drive unit 20 outputs, to the light valve 17, a drive signal for driving the liquid crystal panel thereof, according to the frame-based image data inputted form the image processing unit 19 and a control signal inputted from the control unit 22. Based on the drive signal outputted from the light valve drive unit 20, an image is drawn on the liquid crystal panel and the light emitted from the LEDs 161R, G and B is modulated. The image processing unit 19 outputs, to the light source drive unit 15, a control signal for adjusting the light emitting state of the LEDs 161R, G and B.

The storage device 21 is a storage device formed with a flash memory or the like. The storage device 21 can be a storage device that is removably provided such as a memory card, a semi-fixed or fixed built-in storage device such as an SSD (solid state drive), or both of these. The storage device 21 stores various data in a non-volatile and rewritable manner under the control of the control unit 22. In the storage device 21, image data forming a video to be displayed, and image data or the like corresponding to ID information, later described, are stored in advance.

The command receiving unit 26 receives a signal transmitted from an external remote controller (hereinafter referred to as a remote), not shown, that is operated by a user, then generates data represented by the received signal, and outputs the generated data to the control unit 22. The command receiving unit 26 can be configured, for example, as a device which receives an infrared signal transmitted from an external remote. In the case where a plurality of display devices 1 is provided together, as shown in FIG. 2, an infrared signal transmitted from a single remote can be received almost simultaneously by the plurality of display devices 1. The command receiving unit 26 receives a control command transmitted from the remote and a wireless signal representing ID information or the like. Here, the control command is data to specify the content of an instruction by which the user causes the display device 1 to carry out a specific operation. Also, in this embodiment, the ID information is data indicating an ID that is set to each display device 1 in order to identify each display device 1. However, the ID information can include an ID that covers all the display devices 1, that is, a so-called wildcard. If the wild card is designated as the ID information, all the display devices 1 can be collectively designated and made to execute the same control command. Moreover, in this embodiment, it is assumed that an ID is a mark that can be displayed as a video and can be selected by a single operation on the remote. In this embodiment, an ID may include, for example, a number, letter, symbol, or a combination of these. Also, in this embodiment, an ID may include a color such as red, blue or green, and an icon or graphic pattern. The ID information can be made up of data that specifies an ID and image data for displaying the ID as a video. The remote, which transmits the control command and the ID information to the display device 1, can have a key representing a number, letter or symbol, and a key representing a color, and can have, for example, a display device with a touch panel to display an icon or graphic pattern. The ID information can be set by the user, using a setting switch, not shown, provided on the display device 1, or can be set by the user, operating the remote or the like. The ID information is set to have different values for the respective display devices 1, for example, by the user at the time of installation or the like.

The control unit 22 has a CPU (central processing unit), a ROM (read only memory), a RAM (random access memory), a non-volatile memory, a system controller and other peripheral circuits or the like, though not shown. Operating software and application software are stored in the non-volatile memory. A BIOS (basic input/output system) is stored in the ROM. The control unit 22 causes the CPU to execute the BIOS stored in the ROM and the operating software and the application software stored in the non-volatile memory, and thus controls each part. The storage device 21, the light source drive unit 15, the image processing unit 19, the light valve drive unit 20, the command receiving unit 26 and the like are connected to the control unit 22 via the bus 23.

In this embodiment, the control unit 22 includes a command processing unit 221, an initial setting storage unit 222, and a command storage unit 223. The initial setting storage unit 222 is a storage unit which stores a tiling flag (information) and the display device's own ID information. The tiling flag is information indicating whether the display device 1 is used with another display device 1 or not. The tiling flag can be set to either a state indicating that the display device 1 is used with another display device 1 or a state indicating that the display device 1 is not used with another display device 1, for example, by the user operating the remote or the like to set the tiling flag. Alternatively, it is possible to enable the setting of the tiling flag, using a switch such as a dip switch. The ID information is information used in the case where the tiling flag indicates that the display device 1 is used with another display device 1. In the description below, if the tiling flag is ON, it indicates that the display device 1 is used with another display device 1. If the tiling flag is OFF, it indicates that the display device 1 is not used with another display device 1.

The command storage unit 223 stores the control command. The control command is data representing an instruction given by the user in order to cause the display device 1 to carry out a specific operation (that is, data or control signal that specifies the content of the instruction), as described above.

The command processing unit 221 performs the following processing on the basis of the control command received by the command receiving unit 26 and the ID information or the like. That is, the command processing unit 221 controls a display unit in response to the reception of the control command by the command receiving unit 26, and causes the display unit to display the display device's own ID on the basis of the ID information stored in the initial setting storage unit 222. Here, the display unit is a configuration corresponding to the light source drive unit 15, the light source unit 16, the image processing unit 19, the light valve 17, the light valve drive unit 20 and the control unit 22 shown in FIG. 1 or the like. The command processing unit 221 also performs processing corresponding to the control command received before the reception of the ID information, in the case where the command receiving unit 26 receives the ID information indicating the display device's own ID after the display unit starts displaying the display device's own ID.

The command processing unit 221 also reads out image data from the storage device 21 on the basis of the control command received by the command receiving unit 26 and the ID information or the like, then controls the light source drive unit 15, the image processing unit 19, the light valve drive unit 20 and the like, and performs control to project an image based on the image data that is read out. The control unit 22 outputs a predetermined control signal to the switch 14 via the signal line 25 and thus performs ON/OFF control of the power supplied to the light source drive unit 15 and the light source unit 16.

Figure 5:
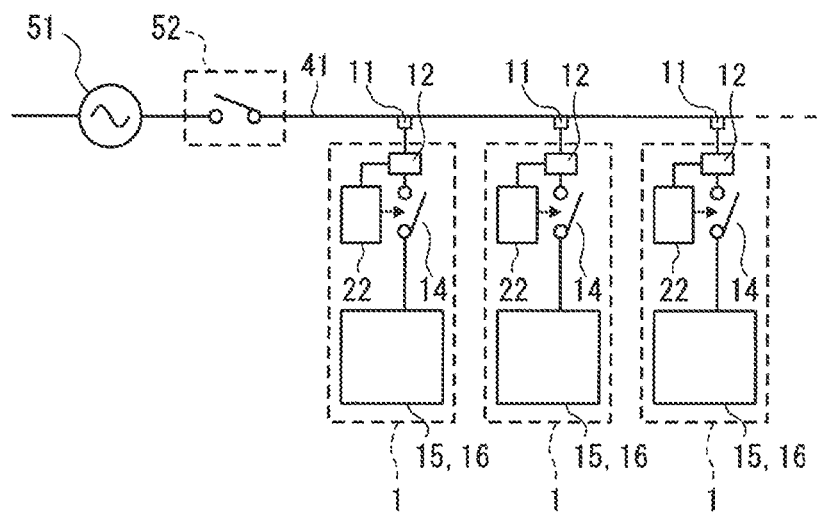
FIG. 5 is an explanatory view for explaining an example of connection of a power system in the case where a plurality of the display devices of FIG. 1 is used together.
Figure 6:
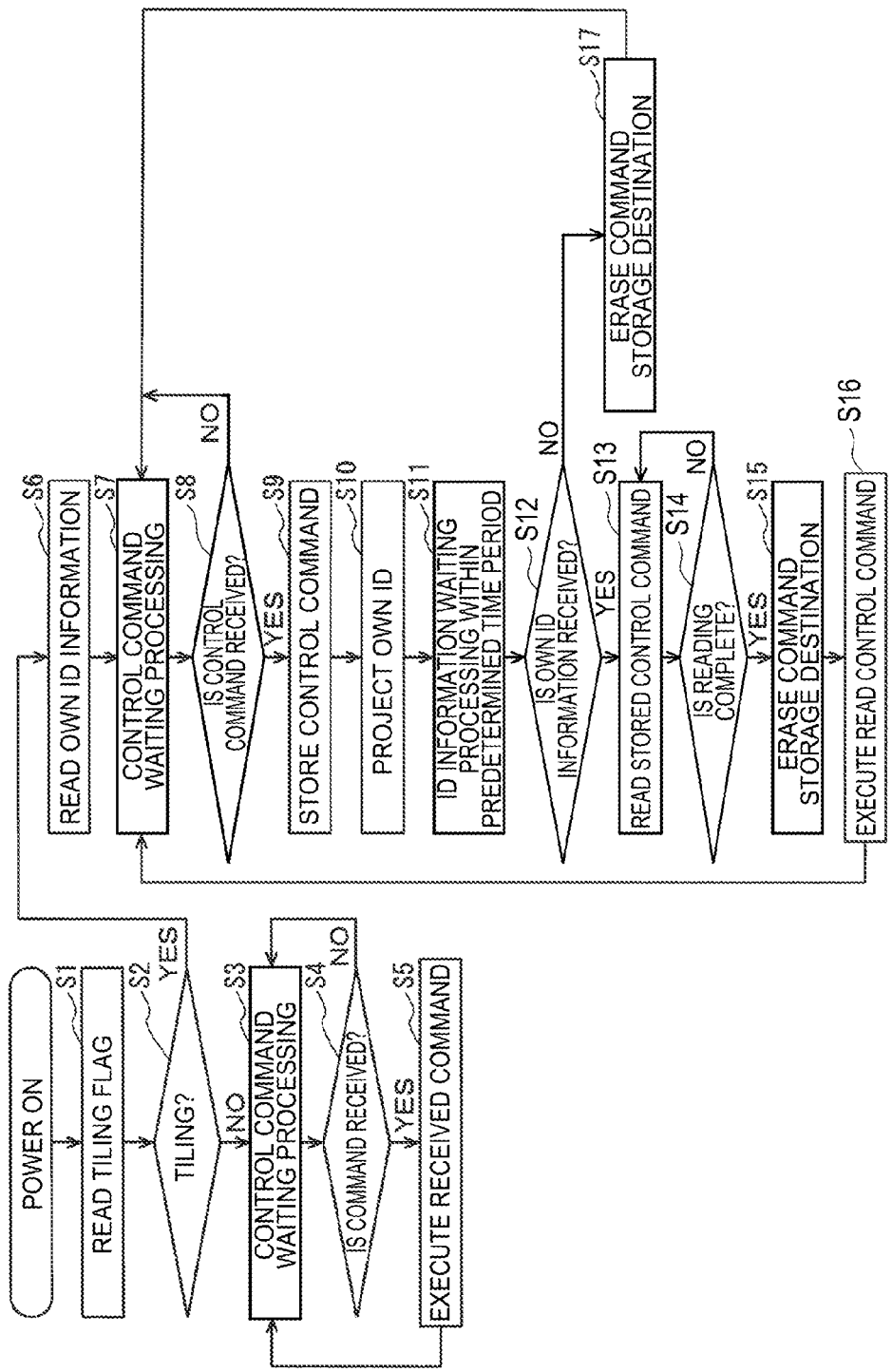
FIG. 6 is a flowchart for explaining an operation example of the display device of FIG. 1.
Figure 7:
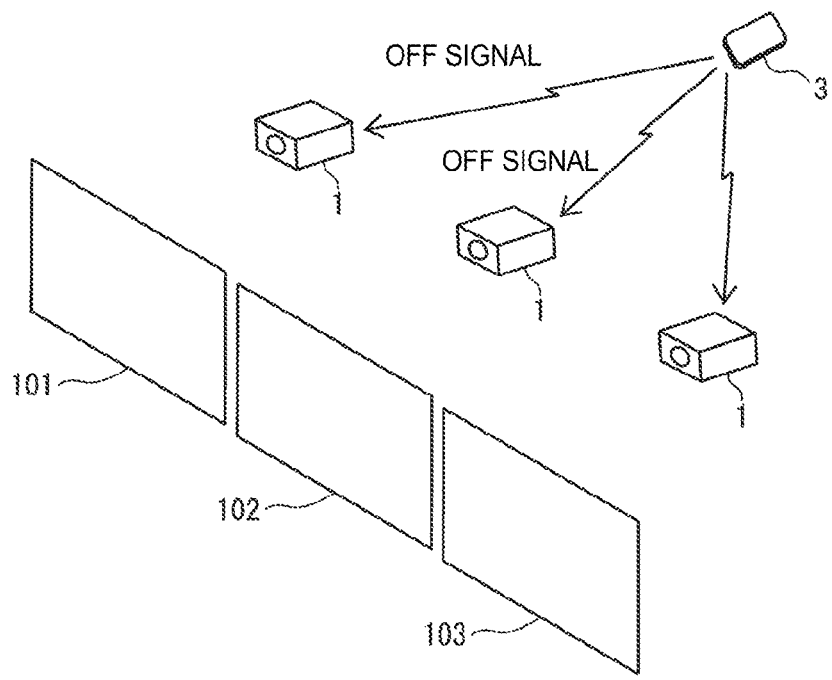
FIG. 7 is an explanatory view for explaining an example of use in the case where a plurality of the display devices of FIG. 1 is used together.

Next, an example of use of the display device 1 described with reference to FIGS. 1 to 4 will be described with reference to FIGS. 5 to 10. FIG. 5 shows an example of connection of a power system for a plurality of display devices 1. FIG. 5 shows an example of connection in the case where three display devices 1 are installed on the duct 41. In FIG. 5, the same parts of the configuration as those shown in FIGS. 1 to 4 are denoted by the same reference numbers. In the example shown in FIG. 5, the duct 41 is connected to mains electricity 51 via a manual power switch 52 installed on a wall surface or the like. As shown in FIG. 7, the three display devices 1 are installed in line, for example, facing a wall surface, not shown. In FIG. 7, it is assumed that the wall surface, not shown, is situated in a diagonally forward left direction. The number of the display devices 1 used together is not limited to three. The power switch 52 may be remotely operable via the remote or the like.

As shown in FIG. 5, each display device 1 is connected to the duct 41 via each connector 11. Therefore, as the power switch 52 is turned on, the mains electricity 51 is connected to each display device 1 synchronously with the change of the power switch 52 to ON. As each display device 1 is connected to the mains electricity 51, the power supply unit 12 in each display device 1 supplies power to the control unit 22 and the like. The control unit 22 starts operating a predetermined program via power-on reset. The control unit 22, for example, performs a predetermined initialization processing to each part, subsequently turns on the switch 14, and performs control to input predetermined power to the light source drive unit 15 and the light source unit 16. In this state, the three display devices 1 project predetermined videos 101, 102 and 103, respectively, on the wall surface, for example, as shown in FIG. 7. Here, the videos 101, 102 and 103 are image data held in the storage devices 21 of the individual display devices 1. The videos 101, 102 and 103 may form, for example, one large video made up of a series of videos, or may be separate videos. That is, each display device 1 displays the image data held therein, when the power switch 52 is turned on. Meanwhile, when the power switch 52 is turned off, the mains electricity inputted to each display device 1 is cut off synchronously with the change of the power switch 52 to OFF, and each display device 1 stops operating. As described above, even in the case where a plurality of display devices 1 is used, the display devices 1 can be turned on and off, for example, by the single power switch 52 on the wall surface. In the example shown in FIG. 7, the respective display devices 1 are installed, holding such a positional relation as to be able to receive, almost simultaneously, the command signal and ID information transmitted from a single common remote 3. It is assumed that the remote 3 shown in FIG. 7 is provided with ten keys and a power key.

Figure 10:
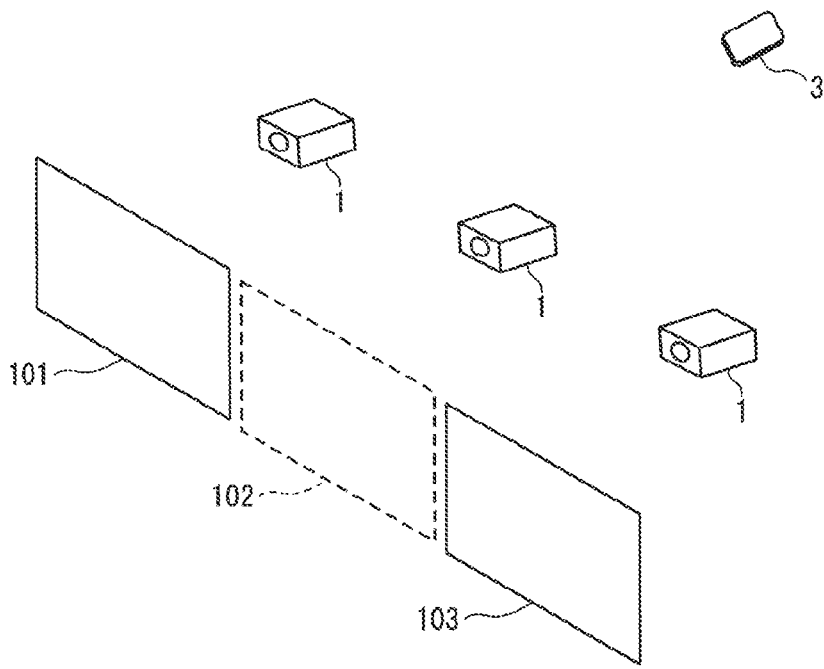
FIG. 10 is an explanatory view for explaining an example of use in the case where a plurality of the display devices of FIG. 1 is used together.

There may be cases where, when the three display devices 1 are displaying the videos 101, 102 and 103 as shown in FIG. 7 as the power switch 52 is turned on, for example, only the power to one or two display devices 1 is to be turned off (that is, the video display is to be turned off). FIG. 10 shows the state where the power to the display device 1 situated in the center is off. For example, such cases may include the case where another exhibit is installed there temporarily and the previous state needs to be restored shortly, or the like. Thus, the display device 1 is provided with the function of separately turning off the power supplied to the light source drive unit 15 and the light source unit 16 under the control of the control unit 22, using the remote 3. An operation of the display device 1 will be described with reference to the flowchart of FIG. 6. FIG. 6 is a flowchart for explaining an example of operation of the display device 1. Hereinafter, explanation will be given separately for the case where the tiling flag is OFF (that is, where the display device 1 is not used with another display device 1) and the case where the tiling flag is ON (that is, where the display device 1 is used with another display device 1).

Where Tiling Flag is OFF

In this case, as the power switch 52 is turned on, the power supply unit 12 in the display device 1 supplies power to each part. Also, as the power switch 52 is turned on, the control unit 22 turns on the switch 14 and controls each part to start projecting a predetermined video. The command processing unit 221 first reads the tiling flag from the initial setting storage unit 222 (Step S1). Next, the command processing unit 221 determines whether the tiling flag is ON or not (Step S2). In this case, since the filing flag is OFF, the command processing unit 221 performs control command reception waiting processing (from "NO" in Step S2 to Step S3). In the control command reception waiting processing in Step S3, the command processing unit 221 repeatedly checks the output from the command receiving unit 26 in a predetermined cycle until the command receiving unit 26 receives a control command from the remote 3. The command processing unit 221 also repeatedly performs the control command reception waiting processing until the command receiving unit 26 receives a control command (repeat Step S3 to "NO" in Step S4 to Step S3 again). Then, if a control command is received ("YES" in Step S4), the command processing unit 221 executes the control command received by the command receiving unit 26 (Step S5). Next, the command processing unit 221 performs the control command reception waiting processing again (Step S3). As described above, in the case where the tiling flag is OFF, the command processing unit 221 immediately processes the control command received from the remote.

For example, if the user operates the power key (or power OFF key) on the remote 3 after the power switch 52 is turned on, the command receiving unit 26 receives a control command designating power OFF from the remote 3. Here, the command processing unit 221 receives the control command designating power OFF from the command receiving unit 26 (Step S3). The command processing unit 221 determines that the control command is received ("YES" in Step S4), and executes the control command designating power OFF (Step S5). In this case, the command processing unit 221 outputs a predetermined control signal to the switch 14 via the signal line 25 and thus turns off the switch 14, which then turns off the power supplied to the light source drive unit 15 and the light source 16.

Where Tiling Flag is ON

Next, an example of operation in the case where the tiling flag is ON will be described. The description below is about the case shown in FIG. 7 where the three display devices 1 are used together. In the example of FIG. 7, it is assumed that ID information indicating the respective IDs of "1", "2" and "3" are set in order from the display device 1 on the left end. It is also assumed that the tiling flag stored in the initial setting storage unit 222 of each display device 1 is set to ON.

In this case, as the power switch 52 is turned on, the power supply unit 12 of the display device 1 supplies power to each part. Also, as the power switch 52 is turned on, the control unit 22 turns on the switch 14 and controls each part to start projecting a predetermined video. The command processing unit 221 first reads the tiling flag from the initial setting storage unit 222 (Step S1). Next, the command processing unit 221 determines whether the tiling flag is ON or not (Step S2). In this case, since the tiling flag is ON, the command processing unit 221 reads the display device's own ID information from the initial setting storage unit 222 (that is, the CPU inside the control unit 22 reads the ID information from the initial setting storage unit 222 into a main storage device such as a RAM inside the control unit 22) (Step S6).

Next, the command processing unit 221 performs control command reception waiting processing (from "YES" in Step S2 to Step S7). In the control command reception waiting processing, the command processing unit 221 repeatedly checks the output from the command receiving unit 26 in a predetermined cycle until the command receiving unit 26 receives a control command from the remote 3 (repeat Step S7 and "NO" in Step S8 to Step S7 again).

If the command receiving unit 26 receives a control command from the remote 3, the command processing unit 221 stores data indicating the content of the control command, in the command storage unit 223 (Step S9). Next, the command processing nit 221 controls each part to project the display device's own ID (Step S10). Next, the command processing unit 221 performs ID information reception waiting processing up to a predetermined time as a limit (Step S11). That is, the command processing unit 221 goes from Step S11 to the processing of the subsequent Step S12, if the command receiving unit 26 receives ID information from the remote 3 or the predetermined time has passed.

In Step S12, the command processing unit 221 determines whether the display device's own ID information is received in the processing of Step S11 or not (Step S12). That is, in Step S12, if the display device's own ID information is received within a predetermined time (that is, within a predetermined period) after the display device's own ID starts to be displayed in Step S11, or if ID information indicating a wild card is received, the command processing unit 221 determines that the display device's own ID information is received, and performs the processing of Step S13 (from "YES" in Step S12 to Step S13). Meanwhile, in Step S12, if ID information is not received within a predetermined time, or if ID information is received within a predetermined time but the ID information is different from the display device's own ID information, the command processing unit 221 determines that the display device's own ID information is not received, and performs the processing of Step S17 (from "NO" in Step S12 to Step S17). However, in the case of performing the processing up to Step S17, the command processing unit 221 controls the display device 1 to stop projecting (the image of) the display device's own ID that is being projected, with the lapse of a predetermined time.

As the processing goes to Step S13, the command processing unit 221 reads the control command stored in the command storage unit 223 (Step S13) and then determines whether the reading of the control command is complete or not (Step S14). If the reading of the control command is complete ("YES" in Step S14), the command processing unit 221 erases the storage content in the command storage unit 223 (Step S15). Next, the command processing unit 221 executes the control command that is read in Step S13 (Step S16). After executing the control command in Step S16, the command processing unit 221 returns to Step S7 and performs the control command reception waiting processing (from Step S15 to Step S7). In Step S16, after executing the control command, the command processing unit 221 changes the video to be projected, according to the content of the control command. For example, if the control command is not a command of power OFF, the command processing unit 221 performs processing to return the video to be projected, to the video previously projected before the projection of the display device's own ID in Step S10.

Meanwhile, if the command processing unit 221 determines in Step S12 that the display device's own ID information is not received, the command processing unit 221 erases the storage content in the command storage unit 223 (Step S17), then returns to Step S7, and performs the control command reception waiting processing (from Step S17 to Step S7). In Step S17, after erasing the storage content in the command storage unit 223, the command processing unit 221 performs processing to return the video to be projected, to the video previous projected before the projection of the display device's own ID in Step S10.

Next, an example of operation of each display device 1 in the case where the three display devices 1 are used together will be described with reference to FIGS. 7 to 10. FIG. 7 schematically shows the state where, while the command processing unit 221 is performing the control command waiting processing in Step S7 of FIG. 6, the user operates the power key (or power OFF key) on the remote 3 so that the remote 3 transmits a control command designating power OFF. In the example shown in FIG. 7, the three display devices 1 are displaying predetermined videos 101, 102 and 103, respectively. In this state, a control command designating power OFF is transmitted from the remote 3 to the three display devices 1. Here, as the command receiving unit 26 in each display device 1 receives the control command from the remote 3, the command processing unit 221 in each display device 1 receives the control command designating power OFF from the command receiving unit 26 and stores the control command in the command storage unit 223 (from "YES" in Step S8 to Step 9S).

Figure 8:
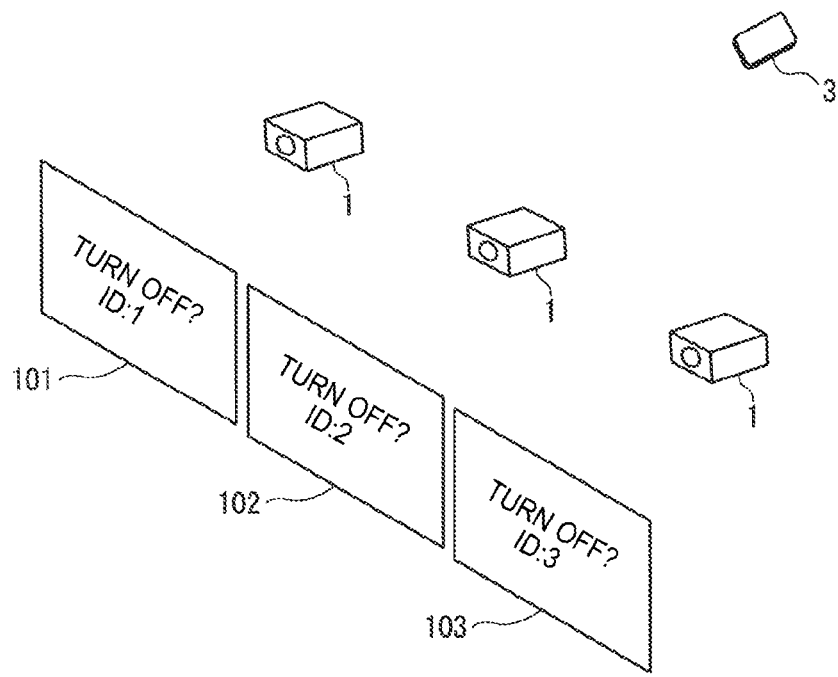
FIG. 8 is an explanatory view for explaining an example of use in the case where a plurality of the display devices of FIG. 1 is used together.
Figure 9:
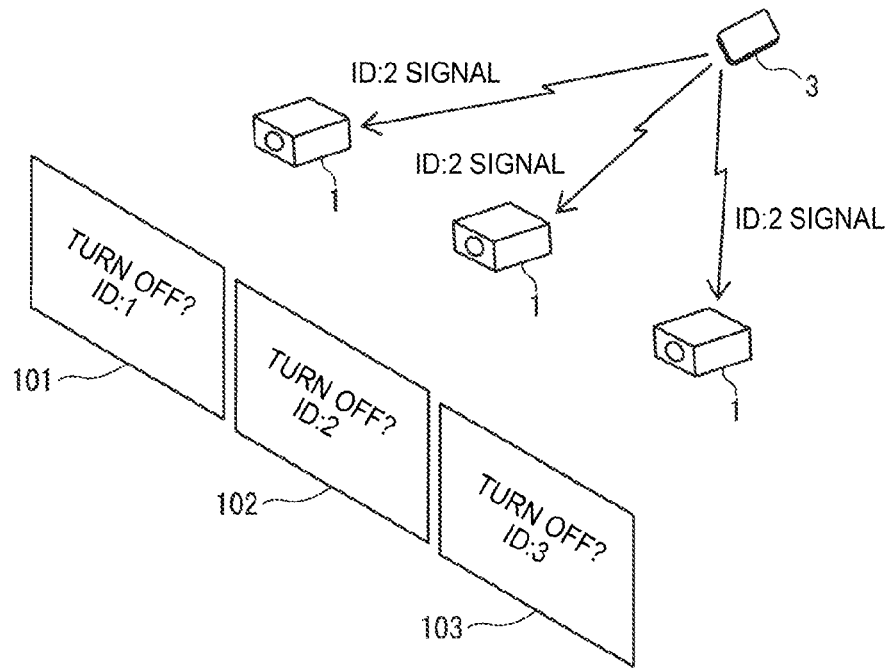
FIG. 9 is an explanatory view for explaining an example of use in the case where a plurality of the display devices of FIG. 1 is used together.

Next, the command processing unit 221 controls each part to project the display device's own ID (Step S10), for example, as shown in FIG. 8, and then performs the ID information reception waiting processing (Step S11). In the example shown in FIG. 8, the display devices 1 display a confirmation message "Turn OFF?" to the user and also display letters "ID:1", "ID:2" and "ID:3", respectively. In this example, all the display devices 1 project the display devices' own IDs, thereby prompting the user to input one of the IDs via the remote 3. It is now assumed that the user operates the key "2" of the ten keys on the remote 3 and the remote 3 transmits ID information indicating "2" to each display device 1, as shown in FIG. 9, within a predetermined time after each display device 1 displays the display device's own ID. In this case, in each display device 1, the command receiving unit 26 receives the ID information indicating ID=2.

In the case where the three display devices 1 receive the ID information indicating ID=2 as shown in FIG. 9, in the two display devices 1 on the left and right, the command processing unit 221 determines that the display device's own ID information is not received ("NO" in Step S12). Therefore, the command processing unit 221 erases the storage content in the command storage unit 223 and restores the previous video (Step S17), then returns to Step S7, and performs the control command reception waiting processing (from Step S17 to Step S7).

Meanwhile, in the one display device 1 in the center, the command processing unit 221 determines in Step S12 that the display device's own ID information is received ("YES" in Step S12). In this case, the command processing unit 221 reads the control command stored in the command storage unit 223 (Step S13) and then determines whether the reading of the control command is complete or not (Step S14). In this case, in Steps S13 and S14, the command processing unit 221 reads the control command designating power OFF stored in the command storage unit 223 and thus stands by for command execution. When the reading of the control command is complete ("YES" in Step S14), the command processing unit 221 erases the storage content in the command storage unit 223 (Step S15). Next, the command processing unit 221 executes the control command designating power OFF that is read in Step S13 (Step S16). In this case, the command processing unit 221 outputs a predetermined control signal to the switch 14 via the signal line 25 and thus turns off the switch 14, which then turns off the power supplied to the light source drive unit 15 and the light source unit 16. Next, the command processing unit 221 returns to Step S7 and performs the control command reception waiting processing (from Step S15 to Step S7).

By the above processing, after receiving the ID information of ID=2 shown in FIG. 9, the two display devices 1 on the left and right of the respective display devices 1 display a predetermined video, and the one display device 1 in the center stops projecting the video, as shown in FIG. 10. That is, in this embodiment, as each display device 1 receives a common control command, each display device 1 displays a preset ID for identification and stands by for execution of processing. Subsequently, each display device 1 executes the control command only when an ID for identification of the display device itself is received. Also, in this embodiment, for example, whether to use the plurality of display devices 1 together is set using a tiling flag. Thus, it is possible to switch between immediate processing of a control command from the remote 3, and processing of the control command after checking the ID of the control target.

In the example shown in FIG. 9, the ID information of the single ID=2 is transmitted to each display device 1 from the remote 3. However, for example, ID information indicating two or more IDs may be transmitted. Also, if ID information indicating a wild card is transmitted from the remote 3, all the display devices 1 execute the subsequent control command.

In FIG. 6, the erasure of the saved content in the command storage unit 223 is performed at the time of completion of command reading, for example. However, the saved content may be erased after the completion of command execution or after the lapse of a predetermined time. The flowchart shown in FIG. 6 includes the main processing performed by the command processing unit 221. For example, error processing or the like in the case where a control command is not stored in the command storage unit 223 at the time of receiving an ID is omitted.

The flow of the processing at the time of power OFF can be summarized as follows. It is now assumed, for example, that the three display devices 1 shown in FIG. 7 are displaying one large video which is laid across the three display devices 1. The case where the user wants to turn the power OFF in order to adjust the display device 1 in the center is considered. In this case, (1) the user transmits a control command of power OFF from the remote 3 (FIG. 7). (2) Next, each display device 1, having received the control command of power OFF, displays a preset ID (FIG. 8). (3) Next, the user transmits the ID of the display device 1 to which the user wants to turn the power OFF (here, ID:2) from the remote 3 (FIG. 9). (4) Consequently, only the display device 1 with the ID of 2 (the display device 1 in the center) performs power OFF processing and the screen disappears (FIG. 10).

That is, the user can select an arbitrary display device 1 from the plurality of display devices 1 and perform desired control, by two operations: (I) pressing an OFF command button, and (II) selecting the ID of the target display device 1 after each display device 1 displays the display device's own ID in response to (I). That is, in the case of controlling the plurality of display devices 1 via the common remote 3, the display devices 1, having received a control command, display IDs that are allocated in advance. Subsequently, only the display device 1 corresponding to the ID transmitted from the remote 3 executes control processing. Therefore, the user need not remember the association between IDs and the actual display devices 1. Also, since a control command is transmitted first so as to cause the display devices 1 to display the IDs and then ID information is transmitted so as to designate a display device 1, there is no need to give any instruction to display the IDs. Therefore, control can be performed with a smaller number of operations than in the case of designating an ID first and then performing the subsequent operation.

As described above, according to this embodiment, the user only needs to execute two process steps: (1) transmitting a control command, and (2) designating the ID of the target display device. Therefore, the number of operations performed is smaller than in the case of designating an ID first and then performing the subsequent operation. In this case, the user need not remember the IDs or the like of the display devices 1. The remote 3 need not have a special function, either. Thus, convenience in the case of controlling an arbitrary display device 1 from among a plurality of tiled display devices 1 with a common remote can be improved.

Modification of First Embodiment

As the configuration of a modification of the first embodiment, the way of transmitting a control command and ID information from the remote 3 to each display device 1 can be modified as follows. That is, the display devices 1 are additionally provided with a configuration for mutually communicating with the other display devices 1 via wired or wireless communication. Each display device 1 is set as a master or slave. In this configuration, only the master display device 1 receives an infrared signal from the remote 3. Based on the received infrared signal, the master display device 1 sends a control command and ID information to the slave display devices 1 via a wired or wireless network. Also in this modification, as the user transmits a control command (OFF command or the like) via the remote, each display device 1 can be made to operate, following the procedures in which all the display devices 1 project the display devices' own IDs, thus prompting the user to input the ID of the display device 1 which the user wants to use as the target of the control command. In this modification, the remote may be a remote that carries out one-to-one communication with the master display device 1 by pairing (for example, a remote of the Bluetooth (trademark registered) standard).

In the embodiment, the processing of power OFF, that is, the processing to turn off the display unit is described as an example of the predetermined processing which the user causes a desired display device to perform. However, the predetermined processing is not limited to this. For example, the predetermined processing may be arbitrary, such as processing to turn on the power again only in the display device where the power is OFF, or processing to change or adjust the display sate or display video. Specifically, the predetermined processing executed by the command processing unit 221 may include "mute" to lower (or reduce to zero) the luminance of projected light while the power remains ON, display of a menu image for controlling the display devices, switching of the image content to be projected, switching of the input source of the image content, switching from image projection to lighting projection, or the like, in addition to the above power OFF.

The light valve is not limited to transmission-type liquid crystal and may be reflection-type liquid crystal. The light valve is not limited to liquid crystal and may be a DMD (digital mirror device).

While the display device is described as being a projector, the display device may be a liquid crystal display device in which the display surface is formed by a liquid crystal panel, or the like. The remote 3 can also be realized, for example, by a combination of a mobile phone and a predetermined application, or can use weak radio waves instead of infrared rays.

A program for realizing the function of an arbitrary configuration part of the above-described devices (for example, the display device 1) may be recorded in a computer-readable recording medium, and the program may be read and executed by a computer system. The "computer system" herein includes an OS (operating system) and hardware such as peripheral devices. The "computer-readable recording medium" refers to a portable medium such as a flexible disk, magneto-optical disc, ROM (read only memory) or CD (compact disk)-ROM, or a storage device such as a hard disk provided inside a computer system. The "computer-readable recording medium" also includes a medium which holds the program for a predetermined time, such as volatile memory (RAM (random access memory)) inside a computer system functioning as a server or client when the program is transmitted via a network such as the internet or via a communication line such as a telephone line.

The program may be transmitted from a computer system having this program stored in a storage device or the like, to another computer system via a transmission medium or via transmission waves in a transmission medium. Here, the "transmission medium" for transmitting the program refers to a medium having the function of transmitting information, such as a network (communication network) such as the internet, or a communication line such as a telephone line.

The program may be configured to realize a part of the foregoing functions. Moreover, the program may be a so-called differential file (differential program), which can realize the foregoing functions when combined with a program that is already recorded in a computer system.

Also, while the display device 1 in the above description is described as being used "with" another display device, the display device 1 may be used "in parallel with" or "simultaneously with" another display device, as an equivalent concept or subordinate concept thereof.

What is claimed is:

1. A display device that can be used with another display device, the display device comprising:
   a display unit;
   a command receiving unit which receives a control command and ID information from an external remote controller;
   a control command storage unit which stores the control command; and
   a command processing unit which stores the received control command into the control command storage unit in response to reception of the control command by the command receiving unit,
   wherein
   the display unit displays the display device's own ID in response to reception of the control command by the command receiving unit,
   the command receiving unit receives the ID information from the external remote controller after the display unit starts displaying the display device's own ID, and
   the command processing unit
   reads the control command from the control command storage unit and performs processing corresponding to the stored control command when the ID information indicates the display device's own ID, and erases the control command stored in the control command storage unit and does not perform processing corresponding to the control command when the ID information is different from the display device's own ID.

2. The display device according to claim 1,
further comprising a storage unit which stores information indicating whether the display device is used with the another display device,
wherein if the information indicates that the display device is used with the another display device, the display unit displays the display device's own ID in response to reception of the control command by the command receiving unit, and
if the information does not indicate that the display device is used with the another display device, the command processing unit performs processing corresponding to the control command in response to reception of the control command by the command receiving unit.

3. The display device according to claim 1,
further comprising a control command storage unit which stores the control command,
wherein in response to reception of the control command by the command receiving unit, the command processing unit stores the received control command into the control command storage unit,
if the command receiving unit receives the ID information indicating the display device's own ID after the display unit starts displaying the display device's own ID, the command processing unit reads the control command from the control command storage unit and performs processing corresponding to the control command that is read, and
if the command receiving unit does not receive the ID information indicating the display device's own ID after the display unit starts displaying the display device's own ID, the command processing unit erases the control command stored in the control command storage unit.

4. A control method for a display device that can be used with another display device,
the display device including:
a display unit;
a command receiving unit which receives a control command and ID information from an external remote controller;
a control command storage unit which stores the control command; and
a command processing unit,
the method comprising:
causing the command processing unit to store the received control command into the control command storage unit in response to reception of the control command by the command receiving unit;
causing the display unit to display the display device's own ID in response to reception of the control command by the command receiving unit;
receiving the ID information from the external remote controller after the display unit starts displaying the display device's own ID; and
causing the command processing unit to
read the control command from the control command storage unit and perform processing corresponding to the stored control command when the ID information indicates the display device's own ID; and
erase the control command stored in the control command storage unit and not perform the processing corresponding to the control command when the ID information is different from the display device's own ID.

5. A display device that can be used with another display device, the display device comprising:
a display unit;
a command receiving unit which receives a control command and ID information from an external remote controller;
a storage unit which stores information indicating whether the display device is used with the another display device; and
a command processing unit,
wherein
if the information indicates that the display device is used with the another display device, the display unit displays the display device's own ID in response to reception of the control command by the command receiving unit,
when the command receiving unit receives the ID information indicating the display device's own ID after the display unit starts displaying the display device's own ID, the command processing unit performs processing corresponding to the control command,
when the command receiving unit receives the ID information different from the display device's own ID after the display unit starts displaying the display device's own ID, the command processing unit does not perform processing corresponding to the control command, and
if the information does not indicate that the display device is used with the another display device, the display unit does not display the display device's own ID and the command processing unit performs processing corresponding to the control command in response to reception of the control command by the command receiving unit.

* * * * *